UNITED STATES PATENT OFFICE.

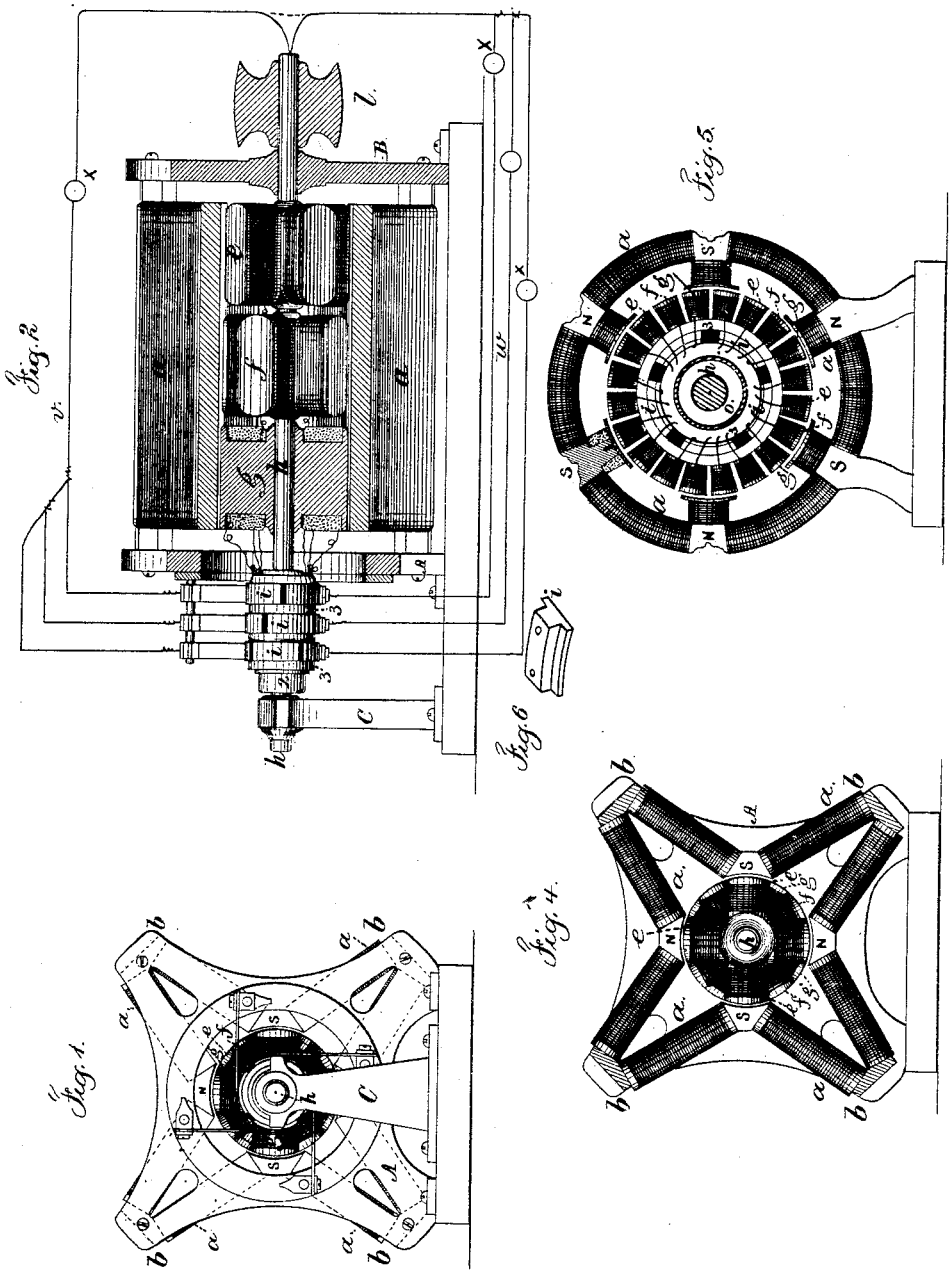

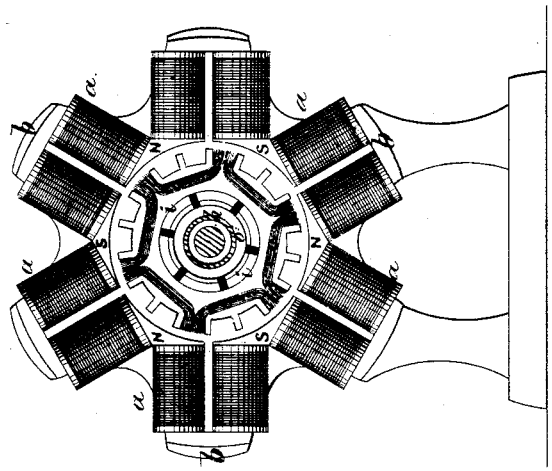
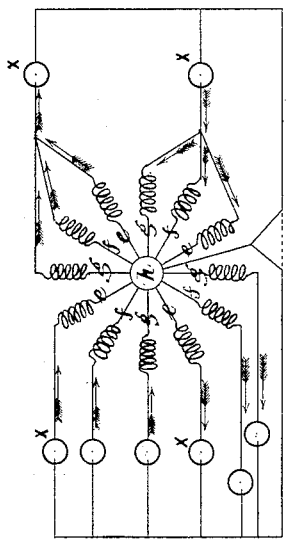
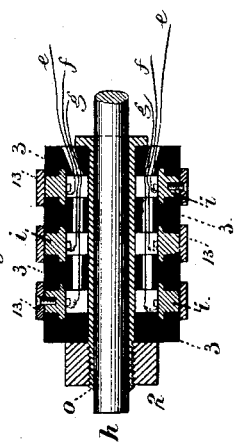

OTTO HEIKEL, OF JERSEY CITY, NEW JERSEY, ASSIGNOR TO THE NATIONAL ELECTRIC LIGHT AND POWER COMPANY, OF NEW YORK, N. Y.

MAGNETO-ELECTRIC MACHINE.

SPECIFICATION forming part of Letters Patent No. 261,850, dated August 1, 1882.

Application filed May 2, 1879. Patented in France May 18, 1878.

*To all whom it may concern:*

Be it known that I, OTTO HEIKEL, of Jersey City, in the county of Hudson and State of New Jersey, have invented an Improvement in Magneto-Electric Machines, of which the following is a specification.

In the drawings, Figure 1 is an end view of the machine. Fig. 2 is a longitudinal section of the field-of-force magnets and of one of the armature-helices, the other parts being in elevation. Fig. 3 is a section of commutator. Fig. 4 is an end view of the magnets, and Fig. 5 is an end view of a modification of the magnets.

In Letters Patent Nos. 184,377 and 155,376, granted to me, the field-of-force magnets are represented as forming a square, with the poles united, and within which the armature-cores revolve. In my Patent No. 155,376 the helices and cores of the field-of-force magnets are extended in the direction of the axis of rotation.

In my present application the cores of the field-of-force magnets are brought together at the poles at an inclination to each other, so as to allow for the introduction of poles of greater width than those in aforesaid patents.

The field-of-force magnets are made of the cores and helices $a\ a$, placed at an inclination to each other, as shown in Fig. 4, so that they diverge from a narrow base-piece, $b$, and the cores are united to form the poles N S, that alternate, as represented, and these magnets are to be of the desired length, so as to extend over the entire revolving armatures and helices.

In my Patent No. 155,376 the field-of-force magnets are represented as extending over three sections, composing the revolving armature.

In my present machine I make use of a revolving armature with three or more sectional cores; but instead of placing them in line, as in said patent, they are at different angular positions, so as to come into the magnetic field in succession.

The armature-cores and helices $e, f$, and $g$ are upon the shaft $h$, each core and its helix are elongated, and four of these placed at right angles form a section. There being three sections, there should be a difference of thirty degrees in the position of one section to the next.

The field-of-force magnets are sustained by the frames A B, and the shaft H is supported at one end in B and at the other end by the standard C, and driven by a pulley, $l$.

The special feature of my invention relates to the commutator. The same is formed of segments of metal, $i$, having curved flanges at the bottom, as shown in larger size in Fig. 6.

There is a tube of metal, $o$, upon the shaft $h$, with a flange at one end and a screw for a nut, 2, at the other end. Upon this tube there are rings 3, of hard rubber, wood, or other insulating material, having grooves in the opposite faces, into which are received the flanges of the segmental commutator-blocks $i$. These blocks are held in their positions by the insulating-rings, and they can be adjusted with facility, so as to occupy the most advantageous positions for taking off the current, and there is a space between the commutator-block $i$ and the tube $o$, through which the insulated wires pass and are connected to their respective commutator-blocks.

I prefer to use with each commutator-block a movable cap-piece, 13, in the form of a segment of a cylinder, screwed to $i$, so that the surface of the commutator can be renewed when worn out without disturbing the connections.

There being three differently-placed sections to the revolving armature, there must be three sections to the commutator and three sets of springs, each set composed of four springs.

In connecting the armature-helices one end of each helix is connected to the shaft $h$ and the other end is connected to its commutator-plate. Hence it will be seen that the current will circulate from the helix to the commutator-plate and its spring, and can be taken away by a wire for any electrical operation, and will return to the shaft or through a common conductor to a helix of opposite polarity regardless of the polarity of the current, and that as many circuits can be taken from the machine as there are armature-helices, and that the wires from two or more armature-helices that have the same polarity at the same time can be brought together to increase the quantity or intensity of the current, thus rendering this machine adapted to the different purposes for which magneto-electric machines are employed.

The lines at *v w* in Fig. 2 illustrate the circuit-connections; and I remark that the return-connection to the shaft can be by a spring resting thereon, or the return can be to a helix of opposite polarity, thence through the shaft or other common conductor to the positive helix.

In Fig. 5 I have shown a modification of the field-of-force magnets in which the cores are united with inwardly-projecting cores having a helix around each to increase the magnetism, and the revolving armature-cores and helices are increased in number and stand radially. The commutator and circuit-connections are to be made as before described.

In the diagram, Fig. 7, I have represented the twelve helices of the armature-cores in the circular range. One end of each helix is connected to the central shaft, *h*, or a common conductor. The other end of each helix connects through the commutator with the electric light or other electric device, *x*, and then the return-circuit is any common conductor either to the wires of opposite polarity or back to the shaft.

In Fig. 8 I have represented another arrangement of machine in which this commutator and arrangement of circuits can be employed. In this the separate armature-helices are wound lengthwise between soft-iron poles or bars that form the armature-cores, and the field-of-force magnets are increased in number. The commutator-plates and the circuit-connections are arranged as before described.

In magneto-electric machines heretofore made the armature-helices have been connected to commutator-plates at both ends of the wires. In the present instance one end of each helix goes to a common conductor, and hence, whether the current passing to that common conductor is positive or negative, that common conductor becomes the same to the magneto-machine as ground-connections to galvanic batteries.

I claim as my invention—

1. The commutator made of separate segmental blocks, with flanges between separate grooved rings, loose upon a tube or shaft, and clamped by a nut at the end of the tube or shaft, there being a space between the plate and shaft for the circuit-wires, substantially as set forth.

2. The combination, in a commutator, of the segmental blocks *i*, with flanges, the insulating-rings grooved to support the blocks, a central tube or shaft smaller than commutator, and leaving a space beneath such blocks for the insulated wires, the nut to clamp the blocks and rings, and the removable faces to the commutator, substantially as set forth.

Signed by me this 25th day of April, A. D. 1879.

OTTO HEIKE

Witnesses:
WILLIAM G. MOTT,
GEO. T. PINCKNEY.